United States Patent [19]

Brixner

[11] 4,225,653

[45] Sep. 30, 1980

[54] X-RAY INTENSIFYING SCREEN BASED ON RARE EARTH TANTALATE

[75] Inventor: Lothar H. Brixner, West Chester, Pa.

[73] Assignee: E. I. Du Pont de Nemours and Company, Wilmington, Del.

[21] Appl. No.: 23,966

[22] Filed: Mar. 26, 1979

Related U.S. Application Data

[63] Continuation-in-part of Ser. No. 933,080, Aug. 11, 1978, abandoned.

[51] Int. Cl.$^2$ .................. C09K 11/46; G01T 1/00
[52] U.S. Cl. .................... 428/539; 250/483; 252/301.4 R; 428/913
[58] Field of Search ............ 252/301.4 R; 250/483; 428/539, 913

[56] References Cited

U.S. PATENT DOCUMENTS

| | | | |
|---|---|---|---|
| 3,501,412 | 3/1970 | Ropp | 252/301.4 R |
| 3,574,131 | 4/1971 | Ferri et al. | 252/301.4 R |
| 4,024,069 | 5/1977 | Larach | 252/301.4 R |

FOREIGN PATENT DOCUMENTS

49-34311  9/1974 Japan .................. 252/301.4 R

OTHER PUBLICATIONS

Blasse et al., "J. of Luminescence", 109 (1970).

Wolten et al., "The American Miner", 52, 1536 (1967).

*Primary Examiner*—Jack Cooper

[57] ABSTRACT

X-ray intensifying screen based on a rare earth tantalate phosphor, and process for preparing the phosphor, said phosphor having the monoclinic M' structure and selected from:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent of the yttrium, lutetium or gadolinium is replaced by ytterbium; and
(l) any of (a), (b), (c), (d) and (e) wherein up to 15 mole percent of the yttrium or lutetium is replaced by gadolinium.

15 Claims, 11 Drawing Figures

FIG. 3A  M YTaO$_4$

FIG. 3B  M' YTaO$_4$

X-RAY INTENSIFYING SCREEN BASED ON RARE EARTH TANTALATE

CROSS-REFERENCE TO RELATED APPLICATION

This application is a continuation-in-part of application Ser. No. 933,080 filed Aug. 11, 1978 and expressly abandoned Mar. 27, 1979.

DESCRIPTION

1. Technical Field

This invention relates to the preparation of a luminescent material and to the use of the material in X-ray intensifying screens.

2. Background Art

X-ray intensifying screens are generally used in conjunction with photographic film and serve to enhance the image formed on the film. Phosphors which are the active components of such screens should be clear, colorless, single phase materials, crystallizing in polyhedral shape of well defined habit so as to minimize any scattering of the light generated by the X-rays. Generally, the phosphor particle size should be about 3 to 10 $\mu$m and the surface area should be about 0.075 to 0.300 $m^2/g$. Moreover, the phosphors should be good absorbers of X-ray radiation of the energy used, they should emit light strongly in the region of the spectrum to which the film is sensitive, and they should provide sharp, undistorted film images. While there are many known materials which exhibit luminescence, few have the combination of properties necessary to make them useful in X-ray intensifying screens. For example, the most widely used phosphor for X-ray intensifying screens for many years has been calcium tungstate; it is the standard by which other phosphors are judged. In recent years several other phosphors have been proposed for possible use in X-ray intensifying screens, but the number is small compared to the total number of phosphors which have been discovered.

Blasse and Bril (J. of Luminescence 3, 109 (1970)) describe the cathodo- and photo-luminescent properties of various $YTaO_4$, $GdTaO_4$ and $LuTaO_4$ phosphors, including those in which some of the tantalum is replaced by niobium or some of the yttrium is replaced by rare earth substituents. These materials all have the fergusonite M-type structure. It has been recognized that these materials have two polymorphs, a monoclinic (I2 space group) structure M at low temperatures and a tetragonal (scheelite-type structure with space group I4$_1$/a) at high temperatures. Transition between these two forms is instantaneous and reversible. G. M. Wolten and A. B. Chase (The American Mineralogist 52, 1536 (1967)) report that this transition occurs at 1325° C. in $YTaO_4$. They also disclose a new polymorph of yttrium tantalate and related rare earth tantalates; if the material is crystallized below the transformation temperature, a different monoclinic structure (called M' phase, with space group P2/a) results, which M' phase can be converted to the M phase by heating above 1400° C. and then cooling to below 1325° C.

It is believed that there is no prior art on the luminescent properties of the M'-phase materials under ultraviolet or X-ray excitation.

DESCRIPTION OF THE INVENTION

It has been discovered that certain substituted yttrium, gadolinium and lutetium tantalates, which crystallize in a monoclinic M' structure, show improved X-ray to light conversion efficiencies, compared to those of the hosts, to those of monoclinic M-structure compositions of the same formula and to those of the commonly used commercial phosphor $CaWO_4$. Moreover, it has been found that substitution of appropriate amounts of niobium for tantalum significantly enhances the blue fluorescence of M'-structure $YTaO_4$ and $LuTaO_4$; that substitution of appropriate amounts of thulium for yttrium significantly enhances the blue fluorescence of $YTaO_4$; and that substitution of appropriate amounts of terbium for yttrium, lutetium and gadolium in M'-structure $YTaO_4$, $LuTaO_4$ and $GdTaO_4$ results in strong green fluorescence.

The blue or green fluorescing luminescent-substituted phosphor used in this invention has the monoclinic M' structure and is selected from the group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15; and
(i) a solid solution of at least two of (f), (g) and (h).

The luminescent phosphor is useful in X-ray intensifying screens.

The blue-fluorescing phosphor used in this invention includes:

(a) the Nb-containing yttrium tantalate of the formula $YNb_xTa_{1-x}O_4$ where x is 0 to about 0.15, preferably about 0.001 to about 0.15, more preferably about 0.02 to about 0.10, most preferably about 0.05;

(b) the Nb-containing lutetium tantalate of the formula $LuNb_xTa_{1-x}O_4$ where x is 0 to about 0.2, preferably about 0.005 to about 0.2, more preferably about 0.02 to about 0.05;

(c) the Tm-containing yttrium tantalate of the formula $Y_{1-y}Tm_yTaO_4$ where y is 0 to about 0.03, preferably about 0.001 to about 0.03, more preferably about 0.002 to about 0.01, most preferably 0.005;

(d) a solid solution of (a) and (b); and (e) a solid solution of (a) and (c).

The green-fluorescing phosphor used in this invention includes:

(a) the Tb-containing yttrium tantalate of the formula $Y_{1-y}Tb_yTaO_4$ where y is about 0.001 to about 0.15, preferably about 0.005;

(b) the Tb-containing lutetium tantalate of the formula $Lu_{1-y}Tb_yTaO_4$ where y is about 0.001 to about 0.15, preferably about 0.005;

(c) the Tb-containing gadolinium tantalate of the formula $Gd_{1-y}Tb_yTaO_4$ where y is about 0.001 to about 0.15, preferably about 0.03 to about 0.035; and (d) a solid solution of at least two of (a), (b) and (c).

The phosphor used in this invention has the monoclinic M' structure, with P2/a space group symmetry, and exhibits greater luminescence than related materials having the monoclinic M structure with I2 space group symmetry. Differences in physical characteristics of M- and M'-phase crystals make the two materials easily discernible. The M-phase crystals made by the aforesaid, previously described, known solid state procedure grow in irregularly-shaped pieces, whereas the M'-phase crystals made by the process of this invention grow in regular, nearly polyhedral particles of narrow size distribution. This difference can be seen in the scanning electron micrographs of the two types of materials (depicted in FIGS. 1a and 1b). The M material (FIG. 1b) has a surface area of 1.3 m²/g and a particle size of 0.5 μm. The M' material (FIG. 1a) has a surface area of 0.19 m²/g and a particle size of 4.2 μm. The surface areas reported herein were measured via krypton or nitrogen gas absorption in a "Micromuratics" surface pore volume analyzer. The particle sizes, unless otherwise noted, were calculated from the measured surface areas using the formula $$\text{Particle size } (\mu m) = \frac{6}{\text{Surface area}\left(\frac{m^2}{g}\right) \times \text{Density}\left(\frac{g}{ml}\right)}$$

Figure 2:
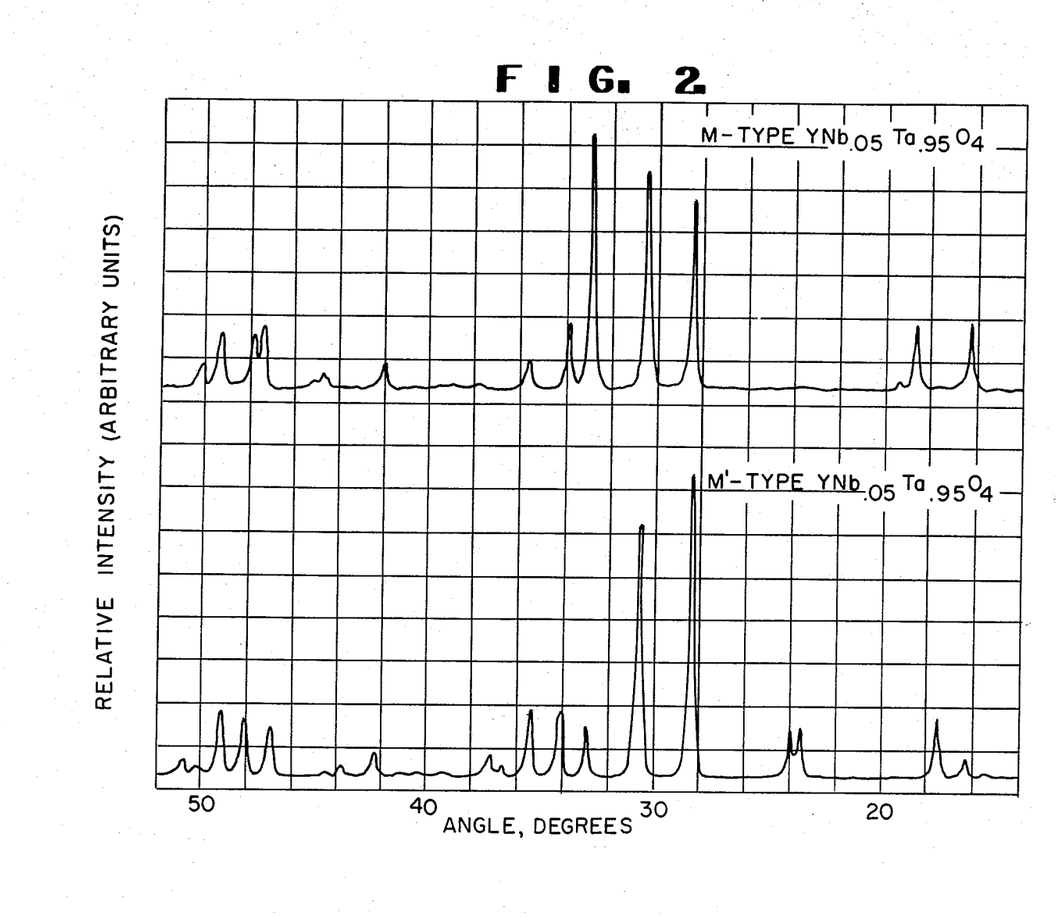
FIG. 2 shows diffractometer scans of X-ray powder patterns for M-type $YTaO_4$ and M'-type $YTaO_4$.
Figure 3A:
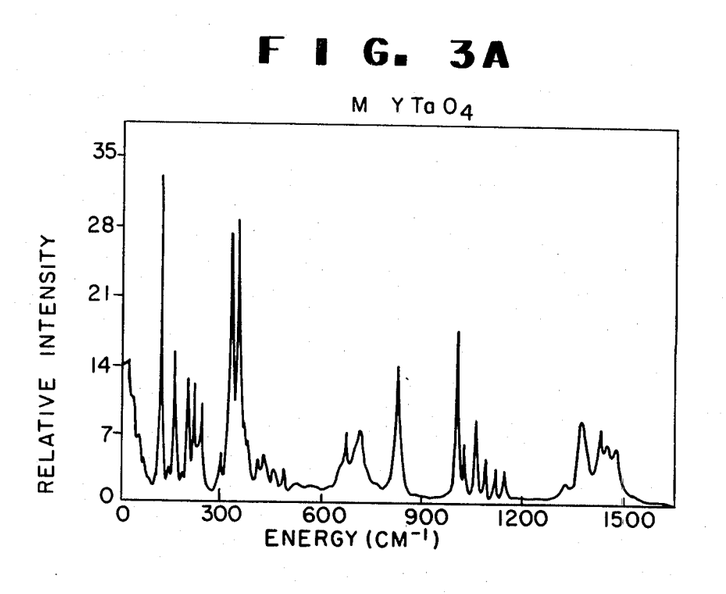
FIGS. 3a and 3b show the Raman spectra for M-type $YTaO_4$ and M'-type $YTaO_4$ respectively.
Figure 3B:
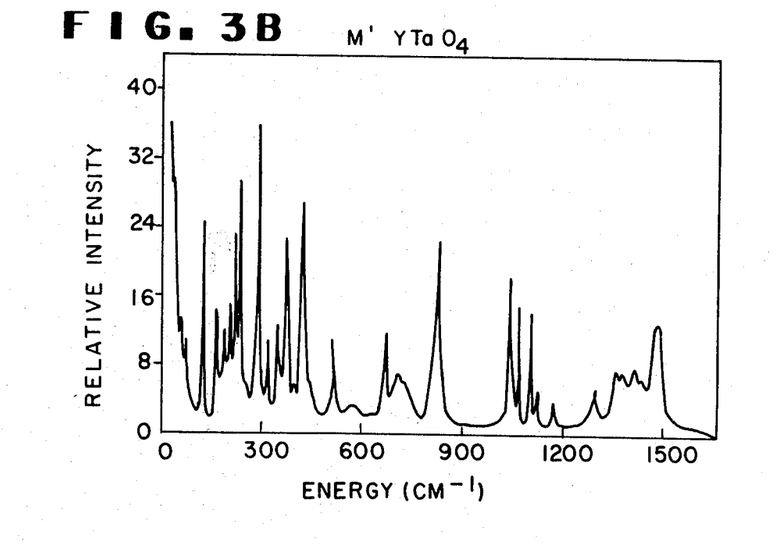

Unit cell parameters obtained from single crystal X-ray diffractometer measurements show that the b-axis and unit cell of the M' phase are approximately half those of the M phase. X-ray powder diffraction patterns show marked differences, as seen from the comparison of the patterns shown in FIG. 2 for M-type $YTaO_4$ and M'-type $YTaO_4$. Differences in the crystal structure of the two phases also affect the Raman spectra as shown in FIGS. 3a and 3b depicting M-type $YTaO_4$ and M'-type $YTaO_4$, respectively.

The invention process provides the M'-type luminescent material, defined above, as uniform, colorless, single-phase particles having a surface area of about 0.075 to 0.300 m²/g and a particle size of about 3 to 10 μm, which material can be directly incorporated into an X-ray intensifying screen without additional processing. The invention process consists of first blending stoichiometric quantities of appropriate oxides from the group $Ta_2O_5$, $Y_2O_3$, $Gd_2O_3$, $Lu_2O_3$, $Nb_2O_5$, $Tb_2O_3$ and $Tb_4O_7$, in a Spex ® oscillating-type shaker, for about 10 to 20 minutes. This mixture, in a container which is inert to the ingredients at process conditions, is then prefired in air at about 1000° C. to about 1200° C. for about 10 to 14 hours. The container can be of a noble metal, but alumina is preferred because of its lower cost. The prefired material is then mixed with a flux comprising $Li_2SO_4$, pure LiCl or a $BaCl_2$/LiCl eutactic (see C. Sandomini, gazz. Chim. ital., 44I, 383 (1914)), with the weight of the flux equalling 1/5 to ½ of the total weight of the mixture. The resultant mixture is then fired for at least about 3 hours to about 24 hours to more at a temperature of about 1100° C. to less than about 1450° C., such as about 1100° C. to about 1300° C. The luminescent product is recovered by water leaching, filtering and washing and then dried. The particle size and uniformity of the phosphor, made according to this process, is shown in the scanning electron micrograph depicted in FIG. 1a.

Alternatively to the above, the prefiring step can be omitted, particularly when $Li_2SO_4$ is used as the flux, and the appropriate oxides which are blended and mixed directly with the flux can be fired as indicated above. Without prefiring, longer firing times, for example, at least about 4 hours to about 14 hours or more, are preferred and advantageous.

The luminescent product is formed in the M' phase by crystallizing the mixture below about 1450° C. Therefore, care must be taken to fire the mixture below this temperature. As indicated above, a firing temperature of about 1100° C. to about 1300° C. is used, with a temperature of about 1200° C. being preferred.

The invention herein provides X-ray intensifying screens wherein the phosphor of the screen is as defined above. Especially surprising is the performance of the phosphor with the M' structure when used in an X-ray intensifying screen. It shows an emission efficiency which is superior to compositions of the same formula but of the M structure; it also is superior to $CaWO_4$. When used in an X-ray intensifying screen the phosphor converts X-radiation into photons which are more readily captured by a photographic emulsion to provide a permanent record.

Figure 4:
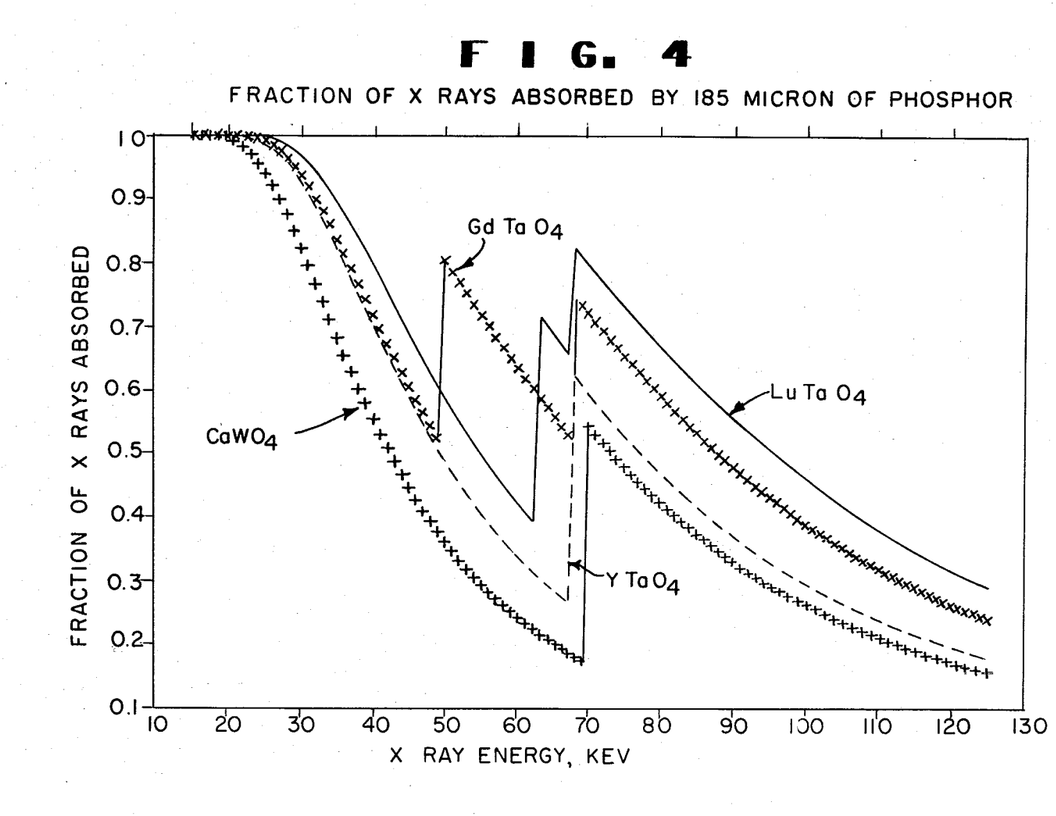
FIG. 4 shows the calculated X-ray absorption of 185$\mu$ layers of M'-type $YTaO_4$, $GdTaO_4$ and $LuTaO_4$ and of $CaWO_4$.

The first step in this conversion process is the absorption of X-rays by the phosphor. FIG. 4 shows the calculated fraction of X-rays absorbed by 185 μm layers of M'-type $YTaO_4$, $GdTaO_4$ and $LuTaO_4$ and of $CaWO_4$ (the latter employed as a standard for comparison herein) over the X-ray energy range commonly used in radiography. It may be seen that for this thickness, which is typical of the phosphor content of pairs of screens commonly used, the tantalate screens of this invention offer improved X-ray absorption.

Figure 5:
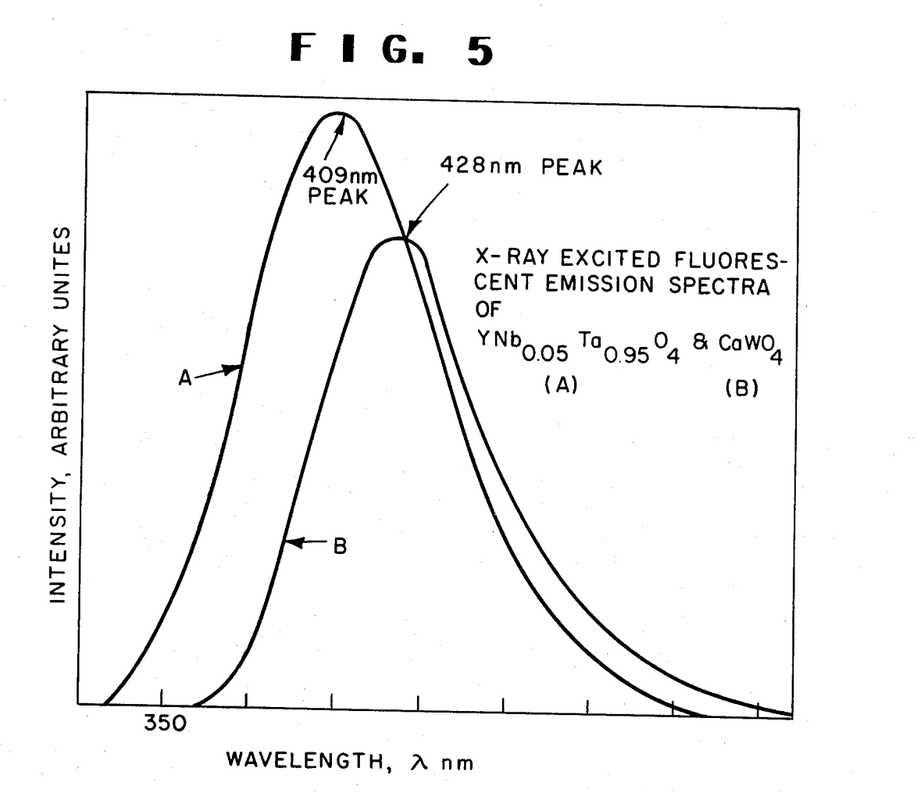
FIG. 5 shows the comparison of the luminescent emission spectra under X-ray excitation for M'-type $YNb_{0.05}Ta_{0.95}O_4$ and $CaWO_4$.

The second step of this conversion process is the emission of light (fluorescence). In many applications it is desirable to have higher efficiency of emission than that shown by $CaWO_4$ in order to reduce the X-ray exposure required to form a radiogram. The efficiency of light emission is indicated by the area under curves such as shown in FIG. 5 where the luminescent emission spectrum (A) of a preferred composition $YNb_{0.05}Ta_{0.95}O_4$, under X-ray excitation, is shown along with, for comparison, the luminescent emission spectrum (B) of a commercial $CaWO_4$ X-ray phosphor, under the same conditions of excitation and measurement. The phosphor used in this invention shows a more intense emission pattern. The emitted light must be captured on the film. Photographic emulsions most commonly used in medical X-ray applications show a generally uniform response to radiation in the range 350 to 400 nm. Beyond 400 nm sensitivity becomes progressively lower; it virtually disappears beyond about 470 nm. YTaO$_4$ and the Nb- and Tm-containing compositions herein show strong blue band emission and peaks around 400 nm and are more effective, when used with conventional film, than CaWO$_4$. LuTaO$_4$ and the Nb-containing compositions also show strong blue band emission. Tb-containing compositions of YTaO$_4$, GdTaO$_4$, LuTaO$_4$ and solid solutions thereof show strong green emission around 500 nm, thus making them effective with X-ray film which is sensitive to such radiation.

In a typical X-ray intensifying screen the powdered phosphor composition, as a thin layer, is adhered to a flexible support, such as cardboard or a polyester film, by means of a polymeric binder. The phosphor-binder composite can contain about 85% to about 96% phosphor, by weight. The phosphor layer is typically coated onto the support at a wet thickness of about 0.005 inch (0.0127 cm) to about 0.050 inch (0.127 cm). The phosphor layer composition can be prepared, using common dispersion techniques, in any conventional binder. This is usually accomplished by ball-milling the phosphor, binder, solvent and other adjuvants for an appropriate period of time. The procedures and useful binding agents are fully described in the prior art, for example, U.S. Pat. Nos. 2,648,013; 2,819,183; 2,907,882; 3,043,710; and 3,895,157.

Optionally, it is frequently desirable to overcoat the phosphor layer with a thin, transparent protective layer, to permit cleaning. Useful protective layers are also described in the prior art, such as the aforesaid United States patents. It is sometimes also desirable first to coat the flexible support (that is, beneath the phosphor) with a light-reflective layer, such as a white pigment, to further intensify the light output of the screen. Reflective layers are well-known in the X-ray screen art. Those such as disclosed in U.S. Pat. Nos. 3,043,710 and 3,895,157 are particularly useful. In actual use the phosphor-coated sheets are usually pressed against both sides of a photographic film with emulsion on each side. Such a pack with phosphor coatings adjacent to photographic emulsion coatings is held in a film cassette for X-ray exposure.

Figure 6:
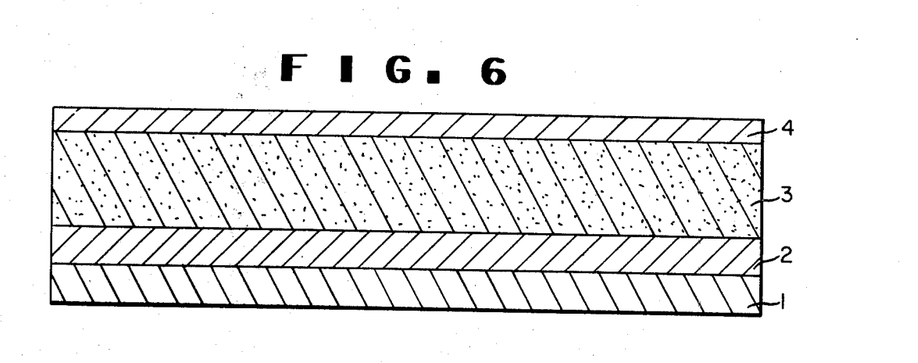
FIG. 6 shows a cross section of a typical X-ray intensifying screen.

FIG. 6, a cross section of an X-ray intensifying screen of this invention, shows the support 1, the reflective layer 2, the phosphor layer 3 and the protective coating 4. Conventional supports which can be used include cardboard, suitably sized or coated, for example, with baryta, cellulose, acetate propionate, cellulose acetate, cellulose propionate, cellulose acetate butyrate, poly(vinyl chloride or vinyl acetate), polyamide, metal sheeting, for example, aluminum, and poly(ethylene terephthalate), the latter being a preferred support. For use in an X-ray intensifying screen, the support must be permeable to X-rays. The support may have, for example, a thickness of about 0.00025 inch (0.00064 cm) to about 0.30 inch (0.76 cm), with films having a thickness up to about 0.02 inch (0.05 cm) being preferred.

Figure 7:
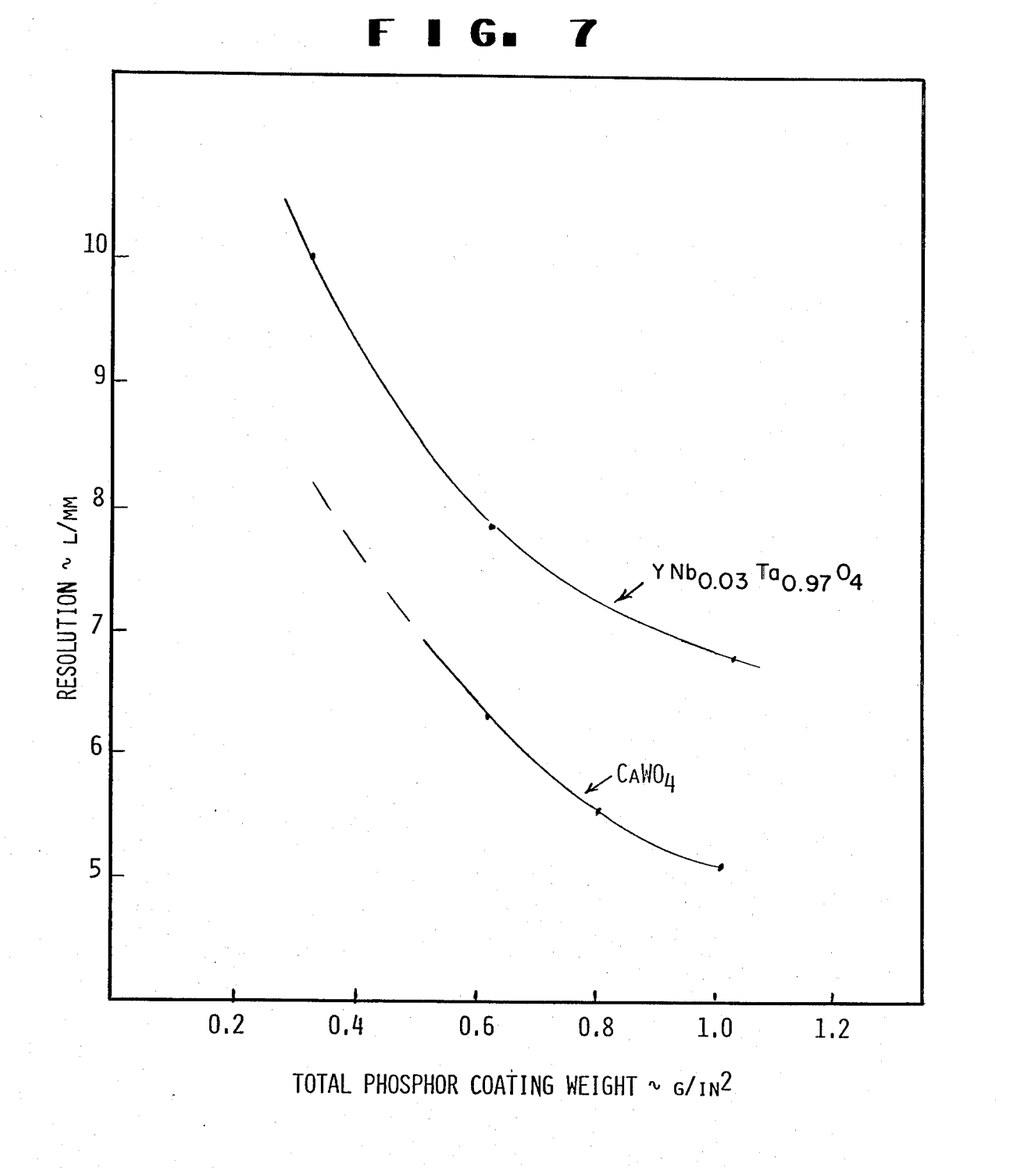
FIG. 7 shows plots of resolution vs. total phosphor coating weight for X-ray screen pairs of the instant invention and for X-ray screen pairs prepared in a similar manner from $CaWO_4$.
Figure 8:
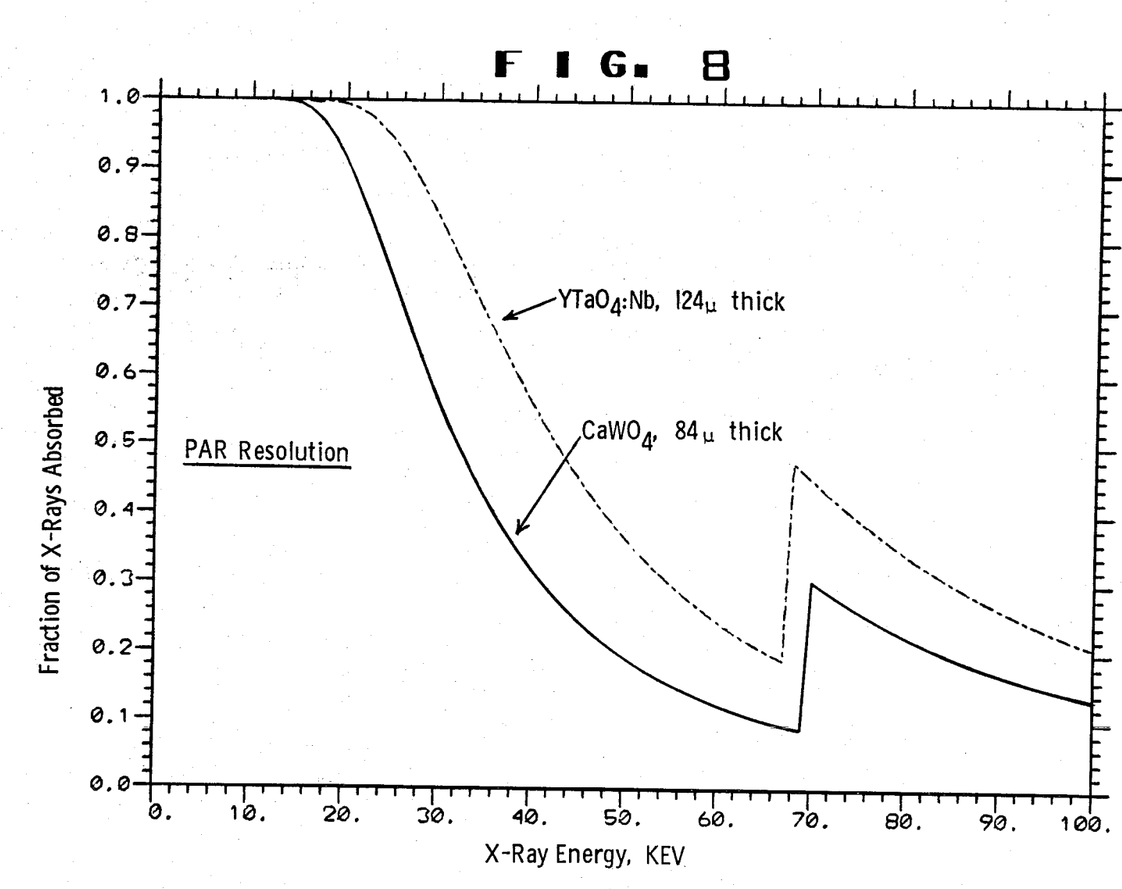
FIG. 8 shows the calculated X-ray absorption for the screen pairs of the instant invention and for those of $CaWO_4$, the screen thicknesses being selected so as to give the same resolution.

The choice of screen thickness generally involves a trade-off between variables such as resolution and image noise. Thin screens have the advantage of high resolution, but suffer from high image noise which is due in part to the fact that they absorb a smaller fraction of the incident X-rays. FIG. 7 shows the relationship between resolution and total phosphor coating weight for CaWO$_4$ and for YNb$_{0.03}$Ta$_{0.97}$O$_4$ when a pair of screens is used to image blue-sensitive, Cronex® 4 X-ray Film with a conventional X-ray unit operating at 80 KVp, 2 mAs. Surprisingly, the YNb$_{0.03}$Ta$_{0.97}$O$_4$ screen pair provides a superior result since, for the same resolution, a substantially higher coating weight can be used. This results in much higher X-ray absorption, and hence lower image noise, for the same resolution. For example, a pair of Cronex® Par intensifying screens made with CaWO$_4$ has a phosphor content equivalent to pure CaWO$_4$ having a thickness of about 84 μm. Commercial-type screens made with YNb$_{0.05}$Ta$_{0.95}$O$_4$, and having the same resolution, contain the equivalent of phosphor having a thickness of about 124 μm. FIG. 8 shows the calculated X-ray absorption for both materials, the latter being shown on the figure as YTaO$_4$:Nb. Over the range of importance in most general-purpose radiography, 40–100 kiloelectron volts (KEV), the YTaO$_4$:Nb screen has almost twice as much X-ray absorption as CaWO$_4$ of equivalent thickness and, thus, provides the possibility of reducing the X-ray exposure to almost half without increasing the image noise.

One measure of performance of an X-ray intensifying screen is the speed (analogous to photographic speed), that is, the optical density achieved after X-ray exposure of a film in contact with the screen. This has been determined by measuring the density of blackening of the X-ray film after exposure of such film in contact with the screen in accordance with the procedure carried out as set forth below.

A. SAMPLE PREPARATION

The phosphor is sieved through a 400 mesh sieve (U.S. Sieve Series) and the following components are introduced into a 15 cc-vial containing eight 4 mm-diameter glass beads (see U.S. Patent No. 3,043,710):
6.19 g of YNb$_{0.05}$Ta$_{0.95}$O$_4$ phosphor (the amount will vary directly with the density of the phosphor)
1.00 ml of butyl acetate
2.54 g of polyvinyl butyral binder.

The resultant mixture is shaken on a Spex® oscillatory-type shaker for 15 minutes, then immediately coated on a pigment board using a Goodner mechanical coater and a 10 mil (254 μm) draw-down knife. The resultant coating is dried in air for at least 15 minutes to give a dry coating of 5±1 mil (130 μm±25 μm) in thickness. A 1 inch×1½ inch (2.54×3.81 cm) sample is cut from the coated board and mounted on a pigment board with other samples and standards for exposure tests.

B. SAMPLE TESTING

The pigment board with the screen samples attached is inserted into an 8 inch×10 inch (20.3 cm×25.4 cm) cassette containing a sheet of high speed medical X-ray film, in this instance Du Pont Cronex® 4 film. An X-ray exposure of 1.0 mAs (at 80 KVp) is made at a distance of 25 inches (63.5 cm) from a tungsten source filtered by ¼ inch (6.35 mm) thick aluminum. The film is then removed and processed in an automatic rapid processer which is operated at 33° C. and contains the standard p-N-methylamine hydrosulfate/hydroquinone developer, with a total processing time of 90 seconds (to develop, fix, wash and dry). The optical density of the exposed and developed film is determined using a MacBeth digital densitometer, recorded as the "speed" and quoted relative to the density of an identical exposure made with a commercial Cronex ® Par intensifying screen made with CaWO$_4$.

As a result of improved X-ray to light conversion efficiency, the speed of the X-ray intensifying screen made with the aforesaid M'-structure phosphor is higher than that made with an M-structure phosphor of the same formula and of a similar coating thickness. Screens made with the M'-structure phosphor containing an appropriate amount of the activator or intensifier Nb, Tm or Tb are faster than those made with a similar phosphor coating which does not contain the activator or intensifier and they are faster than the commonly used CaWO$_4$. This increased speed is important for applications in which lower X-ray exposure is desired.

It is sometimes desirable to adjust the speed of a screen in order to better match the sensitivity of a particular film or to achieve a particular radiological objective. Since it is difficult to adjust the speed of a phosphor such as CaWO$_4$, screen adjustments, for example, slower speeds, are achieved by adding a dye to the screen; however, this can result in image noise being produced. Therefore, it is far more desirable to adjust the speed of the phosphor. The speed of the instant phosphor can be adjusted, over the range of intermediate speeds, between the highest speed measured and reported herein for the instant phosphor and the speed of CaWO$_4$, or even lower, by changing the concentration of the activator or intensifier or by making an appropriate addition of certain other rare earth elements. The dependence of speed on activator concentration is moderately strong and control of speed in this manner requires very careful control of activator concentration. The dependence of speed on the concentration of the certain other rare earth elements is considerably weaker and the use of such elements provides a convenient way of making phosphors with a substantially continuous range of speeds. The speed of the instant phosphor can be slowed by replacing up to about 15 mole percent of the yttrium, lutetium or gadolinium with ytterbium. For example, the addition of Yb to the preferred Nb-containing yttrium tantalate results in the phosphor of the composition $Y_{1-y}Yb_yNb_{0.05}Ta_{0.95}O_4$ where y is 0 to about 0.15. If y is 0 in this formula, that is, if no Yb is present, it can be seen that the resultant compound represents an embodiment of the previously described $YNb_xTa_{1-x}O_4$. As y is increased, the speed of the phosphor decreases until, when y is about 0.1, the speed is about equal to that of the CaWO$_4$ screen. Further increase in y results in further decrease in speed. The speed of the instant phosphor can also be slowed by replacing up to about 45 mole percent of the yttrium, lutetium or gadolinium with lanthanum. For example, the addition of La to the preferred Nb-containing yttrium tantalate results in the phosphor of the composition $Y_{1-y}La_yNb_{0.05}Ta_{0.95}O_4$ where y is 0 to about 0.45. If y is 0 in this formula, that is, if no La is present, it can be seen that the resultant compound represents an embodiment of the previously described $YNb_xTa_{1-x}O_4$. As y is increased, the speed of the phosphor is decreased and when y reaches about 0.4, the speed is about equal to that of the CaWO$_4$ screen. Further increase in y results in further decrease in speed.

The speed of the instant blue-emitting phosphor can be slowed by replacing up to about 15 mole percent of the yttrium or lutetium with gadolinium. For example, the addition of Gd to the preferred Nb-containing yttrium tantalate results in the phosphor or the composition $Y_{1-y}Gd_yNb_{0.05}Ta_{0.95}O_4$ where y is 0 to about 0.15. If y is 0 in this formula, that is, if no Gd is present, it can be seen that the resultant compound represents an embodiment of the previously described $YNb_xTa_{1-x}O_4$. As y is increased, the speed of the phosphor decreases; when y is about 0.08, the speed is about equal to that of the CaWO$_4$ screen. Further increase in y results in further decrease in speed.

Some luminescent materials exhibit an undesirable delayed fluorescence (sometimes called "afterglow", "phosphorescence" or "lag") that results from unexplained, but much slower, secondary emission. Delayed fluorescence becomes a problem only when the phosphor screen is used in rapid succession for several films. Afterglow which persists for times longer than that taken for the film change will then impose a prior image as a ghost on the succeeding film. Net lag (that is, lag minus background) is absent in screens made with the more preferred $YNb_xTa_{1-x}O_4$ where x is about 0.05.

Lag is determined by exposing the screen sample to 400 mAs (80 KVp) X-rays from the same tungsten source described above, but without the aluminum filter, and then, after 15 seconds, contacting the screen sample with a fresh piece of film for 10 minutes. The film is then developed and the optical density is measured as described above. The optical density so recorded is the lag.

Background is determined by exposing a piece of the same X-ray film employed to determine lag to the lag exposure in the absence of any test screen. The difference between the background and lag is recorded as the net lag.

BEST MODE

The preferred phosphor which emits blue light is $YNb_{0.05}Ta_{0.95}O_4$. Stoichiometric amounts of $Ta_2O_5$, $Nb_2O_5$ and $Y_2O_3$ are well blended and then prefired in an alumina container in air at about 1000° C. to about 1200° C. for about 10 to 14 hours. This material is then mixed with an equal amount, by weight, of flux. In the following examples of this composition LiCl was used as the flux; however, $Li_2SO_4$ is the preferred flux material. The resultant mixture is fired for 4 to 14 hours at 1200° C. The $YNb_{0.05}Ta_{0.95}O_4$ M'-structure product in the form of a white uniform powder is recovered by water leaching, filtering and washing and then dried.

In the following examples and experiments parts are by weight unless otherwise noted. X-ray excited speeds were determined by the procedure described above and are reported relative to the speed of Cronex ® Par intensifying screen made with CaWO$_4$, the latter being 1.0 on the relative basis. Since relative intensities may vary with the time of measurement, the relative intensities reported in any of the following tables for compositions being compared therein (in any one table) were determined at substantially the same time.

EXAMPLE 1

$YNb_{0.05}Ta_{0.95}O_4$

Figure 1A:
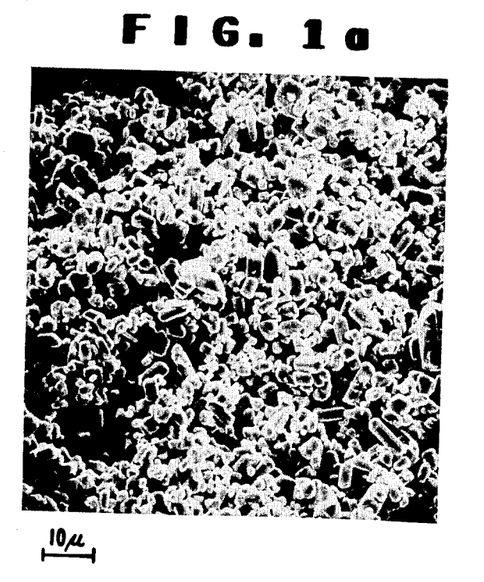
FIGS. 1a and 1b depict, respectively, M'-type $YNb_{0.05}Ta_{0.95}O_4$ of the instant invention, made as disclosed herein, and the scanning electron micrographs of M-type $YNb_{0.05}Ta_{0.95}O_4$, made via conventional ceramic techniques, for example, as disclosed by Blasse and Bril, loc. cit.

A. 10.000 g of $Ta_2O_5$, 0.317 g of $Nb_2O_5$ and 5.381 g of $Y_2O_3$ were weighed to the nearest mg and blended for 30 minutes in a Spex ® oscillating-type shaker. This mixture was prefired in an $Al_2O_3$ container in air at 1000° C. for 14 hours. The prefired material was then mixed with LiCl flux (1 part of prefired material to 1 part of flux) and fired for 4 hours at 1200° C. The product was recovered by water leaching, filtering and washing and then dried. The product (FIG. 1a depicts the electron scanning micrograph) was recovered as a white, uniform powder, which fluoresced bright blue under UV or X-ray excitation, having an average particle size of 4.2 μm (as determined with a Fisher ® sub-sieve sizer) and a surface area of 0.19 m²/g (as determined by gas absorption). X-ray diffraction measurements showed that it crystallized as a single phase with the M' structure and the following lattice constants:
a=5.2975 A
b=5.4486 A
c=5.1103 A
β=96.453 degrees
ρ (X-ray density)=7.46 g ml⁻¹.

The X-ray excited spectrum is similar to that of CaWO₄ but peaks at higher energy (409 vs 428 nm; See FIG. 5). The X-ray excited speed is 1.86 times that of a Cronex ® Par intensifying screen made with CaWO₄.

B. YNb$_{0.05}$Ta$_{0.95}$O$_4$ was prepared in a manner identical to that used for part A above except that the firing at 4 hours was carried out at 1600° C., that is, above the transition temperature. The particulate product was recovered as colorless single-phase YNb$_{0.05}$Ta$_{0.95}$O$_4$ with the M structure, as determined by X-ray diffraction, having a particle size of 5.3 μm and a surface area of 0.15 m²/g. The lattice parameters were:
a=5.3271 A
b=10.933 A
c=5.054 A
β=95.52 degrees
ρ (X-ray)=7.56 g ml⁻¹. The X-ray excited speed was 0.84 relative to the Cronex ® Par intensifying screen (CaWO₄). This is to be compared with 1.86, found for the M'-structure material of the same formula as described in part A above, demonstrating the superior performance of the M'-structure material relative to the M-structure material. Differences in the X-ray diffraction and the Raman spectra of the M and M' materials are shown in FIGS. 2 and 3.

Figure 1B:
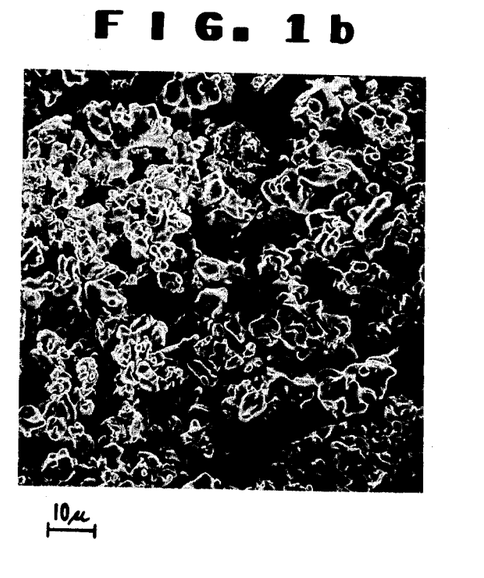

The procedure of this part B was repeated, except that the flux of part A was absent and the firing temperature was 1500° C. Such procedure is representative of known solid state procedures. The electron scanning micrograph of the resultant product is shown in FIG. 1b.

C. YNb$_{0.05}$Ta$_{0.95}$O$_4$ with the M' structure, made in the manner described in part A above, was converted to M-structure material by heating to a temperature of 1600° C. for 2 hours. The X-ray excited speed for this converted material was 0.96, again demonstrating the superior performance of the M'-structure material relative to the M-structure material.

EXAMPLES 2–6

YNb$_x$Ta$_{1-x}$O$_4$

Compositions with various amounts of Nb were prepared according to the procedure used in Example 1. The quantities of the oxides used in each example are shown in Table I. All products were single phase with the M' structure. Particle sizes and surface areas of the phosphor particles are shown along with the X-ray excited speeds. These Examples demonstrate that the instant process yields phosphors of particle size between about 3 μm and 10 μm and surface areas of about 0.075 m²/g to about 0.3 m²/g.

TABLE I

| Ex. No. | Product Composition | Grams Ta₂O₅ | Y₂O₃ | Nb₂O₅ |
|---|---|---|---|---|
| 2 | YTaO₄ | 10 | 5.112 | 0 |
| 3 | YNb$_{0.005}$Ta$_{0.995}$O$_4$ | 10 | 5.138 | 0.030 |
| 4 | YNb$_{0.02}$Ta$_{0.98}$O$_4$ | 10 | 5.216 | 0.123 |
| 5 | YNb$_{0.10}$Ta$_{0.90}$O$_4$ | 10 | 5.680 | 0.568 |
| 6 | YNb$_{0.15}$Ta$_{0.85}$O$_4$ | 10 | 6.014 | 1.062 |

| | Phosphor Particles | | |
|---|---|---|---|
| Ex. No. | Size (μm) | Surface Area m²/g | X-ray Speed |
| 2 | 5.4 | 0.15 | 1.34 |
| 3 | 8.0 | 0.10 | 1.68 |
| 4 | 7.3 | 0.11 | 1.76 |
| 5 | 8.9 | 0.09 | 1.84 |
| 6 | 8.9 | 0.09 | 1.75 |

EXAMPLE 7

To further demonstrate the higher speed of M'-structure material over M material, samples of M' YTaO₄ were prepared according to the procedure of Example 1 and then heated in air for 4 hours at the temperatures indicated in Table II in order to determine the temperature of conversion to M. After being cooled the structure of each sample was determined by X-ray diffraction and its speed as an X-ray phosphor was measured. As shown in Table II the speed drops markedly upon conversion of the phosphor to the M structure.

Additional experiments which were carried out showed that the transition temperature for M' to M conversion is 1455±5° C.

TABLE II

| Temperature to Which Heated | Structure | X-ray Speed |
|---|---|---|
| 1200° C. | M' | 1.08 |
| 1300° C. | M' | 1.05 |
| 1400° C. | M' | 1.08 |
| 1500° C. | M | 0.63 |

EXAMPLES 8–11 and EXPERIMENTS A and B

Y$_{1-y}$Tm$_y$TaO$_4$

Compositions with the M' structure were prepared in a manner identical to that used for Example 1. The amounts of oxides used for each preparation are shown in Table III. All products were single phase with the M' structure. The X-ray excited speeds are also shown in Table III. For comparison Experiments A and B show that as y increases significantly above about 0.02, that is, above about 0.03, the speed decreases markedly. The phosphors of Experiments A and B are not useful in the invention.

TABLE III

| | Product Composition | Grams Ta₂O₅ | Tm₂O₃ | Y₂O₃ | X-ray Speed |
|---|---|---|---|---|---|
| Ex. No. | | | | | |
| 8 | Y$_{0.998}$Tm$_{0.002}$TaO$_4$ | 10 | 0.017 | 5.102 | 1.72 |
| 9 | Y$_{0.995}$Tm$_{0.005}$TaO$_4$ | 10 | 0.044 | 5.086 | 1.78 |
| 10 | Y$_{0.99}$Tm$_{0.01}$TaO$_4$ | 10 | 0.087 | 5.061 | 1.68 |
| 11 | Y$_{0.98}$Tm$_{0.02}$TaO$_4$ | 10 | 0.175 | 5.010 | 1.39 |
| Expt. No. | | | | | |
| A | Y$_{0.95}$Tm$_{0.05}$TaO$_4$ | 10 | 0.437 | 4.856 | 0.48 |
| B | Y$_{0.90}$Tm$_{0.10}$TaO$_4$ | 10 | 0.873 | 4.601 | 0.19 |

EXAMPLES 12–16

$LuNb_xTa_{1-x}O_4$

Compositions with various amounts of Nb were prepared according to the procedure used in Example 1. The quantities of the oxides used in each example are shown in Table IV. All products were single phase with the M' structure. The X-ray excited speeds are also shown.

TABLE IV

| Ex. No. | Product Composition | Grams | | | X-Ray Speed |
|---|---|---|---|---|---|
| | | $Lu_2O_3$ | $Ta_2O_5$ | $Nb_2O_5$ | |
| 12 | $LuNb_{0.005}Ta_{0.995}O_4$ | 10 | 11.046 | 0.033 | 1.2 |
| 13 | $LuNb_{0.02}Ta_{0.98}O_4$ | 10 | 10.879 | 0.134 | 1.5 |
| 14 | $LuNb_{0.05}Ta_{0.95}O_4$ | 10 | 10.546 | 0.334 | 1.5 |
| 15 | $LuNb_{0.1}Ta_{0.9}O_4$ | 10 | 9.991 | 0.668 | 1.4 |
| 16 | $LuNb_{0.2}Ta_{0.8}O_4$ | 10 | 8.881 | 1.336 | 1.1 |

EXAMPLES 17–21 and EXPERIMENTS C and D $Y_{1-y}Tb_yTaO_4$

Compositions with the M' structure were prepared in a manner identical to that used for Example 1. The amounts of oxides used for each preparation are shown in Table V. All products were single phase with the M' structure. For these compositions X-ray performance was measured by exposing a thick ½" (1.27 cm) diameter pellet of phosphor to 20 KVp Mo radiation and detecting the light output from the phosphor with an EMI-Geneom Inc. 9635Q photomultiplier. The intensity of emission is compared to that from an equal area of a Du Pont Cronex® Lo-Dose/2 Mammography Screen made with $CaWO_4$ (reported in the table as Relative Intensity). Considering the reduced sensitivity of the photomultiplier to green light versus blue and the increased X-ray absorption relative to $CaWO_4$ realizable with an 80 KVp X-ray beam, the effective speed is expected to be higher than the relative intensity as measured herein. For a Cronex® 4 X-ray film properly sensitized for green light, the effective speed relative to the Cronex® Par/Cronex® 4 screen/film combination is expected to be about twice the relative intensity. Effective Speed is included in Table V along with the other results. For comparison Experiment C shows that the emission decreases as y increases above about 0.15 and Experiment D shows that emission decreases upon going from the M' structure to the M structure. The M structure was obtained by heating M'-structure material ($Y_{0.995}Tb_{0.005}TaO_4$ made the same as in Example 18) to 1600° C. for 4 hours. The phosphors of Experiments C and D are not useful in the invention.

TABLE V

| | Product Composition | Grams | | | Relative Intensity | Effective Speed |
|---|---|---|---|---|---|---|
| | | $Y_2O_3$ | $Ta_2O_5$ | $Tb_2O_3$ | | |
| Ex. No. | | | | | | |
| 17 | $Y_{0.998}Tb_{0.002}TaO_4$ | 10 | 19.602 | 0.033 | 1.30 | 2.60 |
| 18 | $Y_{0.995}Tb_{0.005}TaO_4$ | 10 | 19.661 | 0.082 | 1.62 | 3.24 |
| 19 | $Y_{0.98}Tb_{0.02}TaO_4$ | 10 | 19.962 | 0.331 | 1.32 | 2.64 |
| 20 | $Y_{0.95}Tb_{0.05}TaO_4$ | 10 | 20.592 | 0.855 | 1.00 | 2.00 |
| 21 | $Y_{0.90}Tb_{0.10}TaO_4$ | 10 | 21.736 | 1.805 | 0.94 | 1.88 |
| Expt. No. | | | | | | |
| C | $Y_{0.80}Tb_{0.20}TaO_4$ | 10 | 24.453 | 4.061 | 0.42 | 0.84 |
| D | $Y_{0.995}Tb_{0.005}TaO_4$ (M structure) | 10 | 19.661 | 0.082 | 0.43 | 0.86 |

EXAMPLES 22–30 and EXPERIMENT E $Gd_{1-y}Tb_yTaO_4$

Compositions with the M' structure were prepared in a manner identical to that used for Example 1. The amounts of oxide used for each preparation are shown in Table VI. All products were single phase with the M' structure. For these compositions X-ray performance was measured by the method used for Examples 17–21. The results are shown in Table VI. Experiment E shows that emission decreases as y increases above about 0.15. The phosphor of Experiment E is not useful in the invention.

TABLE VI

| | Product Composition | Grams | | | Relative Intensity | Effective Speed |
|---|---|---|---|---|---|---|
| | | $Ta_2O_5$ | $Tb_4O_7$ | $Gd_2O_3$ | | |
| Ex. No. | | | | | | |
| 22 | $Gd_{0.998}Tb_{0.002}TaO_4$ | 10 | 0.017 | 8.189 | 0.81 | 1.62 |
| 23 | $Gd_{0.99}Tb_{0.01}TaO_4$ | 10 | 0.085 | 8.042 | 0.90 | 1.80 |
| 24 | $Gd_{0.98}Tb_{0.02}TaO_4$ | 10 | 0.169 | 8.042 | 1.06 | 2.12 |
| 25 | $Gd_{0.975}Tb_{0.025}TaO_4$ | 10 | 0.212 | 8.001 | 1.12 | 2.24 |
| 26 | $Gd_{0.97}Tb_{0.03}TaO_4$ | 10 | 0.254 | 7.960 | 1.15 | 2.30 |
| 27 | $Gd_{0.965}Tb_{0.035}TaO_4$ | 10 | 0.296 | 7.919 | 1.18 | 2.36 |
| 28 | $Gd_{0.96}Tb_{0.04}TaO_4$ | 10 | 0.338 | 7.878 | 1.10 | 2.20 |
| 29 | $Gd_{0.94}Tb_{0.06}TaO_4$ | 10 | 0.508 | 7.713 | 0.82 | 1.64 |
| 30 | $Gd_{0.9}Tb_{0.1}TaO_4$ | 10 | 0.846 | 7.385 | 0.96 | 1.92 |
| Expt. No. | | | | | | |
| E | $Gd_{0.8}Tb_{0.2}TaO_4$ | 10 | 1.692 | 6.565 | 0.43 | 0.86 |

EXAMPLE 31

$Gd_{0.97}Tb_{0.03}TaO_4$

A mixture of 54.9 g of $Ta_2O_5$, 43.70 g of $Gd_2O_3$, 1.40 g of $Tb_4O_7$ and 100.00 g of $Li_2SO_4$ was placed in an alumina container and fired at 1200° C. for 4 hours. The product was recovered by leaching and washing and then dried. X-ray diffraction measurements on the white product showed that it was single phase and had the M' structure. The relative intensity of emission, measured by the method used for Examples 17-21, was 1.36. This result may be compared to that of Example 26 which was carried out according to the procedure of Example 1 which utilized both a prefiring step and a firing step.

EXAMPLE 32

$Gd_{0.97}Tb_{0.03}TaO_4$

A phosphor was prepared using ingredients and procedure identical to that of Example 31 except that the mixture was fired for 24 hours. The single phase M' product gave a relative intensity of emission of 1.59, measured by the method used for Examples 17-21.

EXAMPLES 33-36

$Y_{0.5}Gd_{0.5-y}Tb_yTaO_4$

Solid solution compositions with the M' structure were prepared in a manner identical to that used for Example 1. The amounts of oxide used for each preparation are shown in Table VII. All products were single phase with the M' structure. For these compositions X-ray performance was measured by the method used for Examples 17-21. The results are shown in Table VII.

TABLE VII

| Ex. No. | Product Composition | Grams | | | | Relative Intensity | Effective Speed |
|---|---|---|---|---|---|---|---|
| | | $Y_2O_3$ | $Gd_2O_3$ | $Tb_2O_3$ | $Ta_2O_5$ | | |
| 33 | $Y_{0.5}Gd_{0.495}Tb_{0.005}TaO_4$ | 2.556 | 4.062 | 0.041 | 10 | 1.45 | 2.90 |
| 34 | $Y_{0.5}Gd_{0.49}Tb_{0.01}TaO_4$ | 2.556 | 4.021 | 0.083 | 10 | 1.40 | 2.80 |
| 35 | $Y_{0.5}Gd_{0.475}Tb_{0.025}TaO_4$ | 2.556 | 3.898 | 0.207 | 10 | 1.02 | 2.04 |
| 36 | $Y_{0.5}Gd_{0.45}Tb_{0.05}TaO_4$ | 2.556 | 3.693 | 0.414 | 10 | 1.10 | 2.20 |

EXAMPLE 37

$Lu_{0.995}Tb_{0.005}TaO_4$

This composition was prepared in a manner identical to that used for Example 1, except that 10.000 g of $Ta_2O_5$, 8.963 g of $Lu_2O_3$ and 0.041 g of $Tb_2O_3$ were used. The product was single phase with the M' structure. X-ray performance, that is, the intensity of emission, measured by the method used for Examples 17-21, was 1.0.

EXAMPLES 38-40 AND EXPERIMENT F $Y_{1-y}Yb_yNb_{0.05}Ta_{0.95}O_4$

In order to demonstrate that the intrinsic speed of the phosphor can be adjusted by appropriate substitutions of elements, various amounts of Yb were substituted for Y in the phosphor with the highest speed measured and reported herein, namely, $YNb_{0.05}Ta_{0.95}O_4$, an embodiment of the previously described $YNb_xTa_{1-x}O_4$. The compositions with the M' structure were prepared in a manner identical to that used for Example 1. The amounts of oxide used for each preparation are shown in Table VIII. All products were single phase with the M' structure. For these compositions X-ray performance was measured by the method used for Examples 17-21. The results are shown in Table VIII along with those for the $YNb_{0.05}Ta_{0.95}O_4$ of Example 1 for comparison. The relative intensities of all compositions in the Table were measured at substantially the same time. The phosphor of Experiment F is not useful in this invention.

TABLE VIII

| Ex. No. | Product Composition | Grams | | | | Relative Intensity |
|---|---|---|---|---|---|---|
| | | $Yb_2O_3$ | $Y_2O_3$ | $Nb_2O_5$ | $Ta_2O_5$ | |
| 1 | $YNb_{0.05}Ta_{0.95}O_4$ | 0 | 5.381 | 0.317 | 10 | 1.8 |
| 38 | $Y_{0.995}Yb_{0.005}Nb_{0.05}Ta_{0.95}O_4$ | 0.047 | 5.354 | 0.317 | 10 | 1.7 |
| 39 | $Y_{0.965}Yb_{0.035}Nb_{0.05}Y_{a0.95}O_4$ | 0.329 | 5.193 | 0.317 | 10 | 1.4 |
| 40 | $Y_{0.9}Yb_{0.1}Nb_{0.05}Ta_{0.95}O_4$ | 0.939 | 4.843 | 0.317 | 10 | 0.95 |
| Expt. No. | | | | | | |
| F | $Y_{0.8}Yb_{0.2}Nb_{0.05}Ta_{0.95}O_4$ | 1.878 | 4.305 | 0.317 | 10 | 0.31 |

EXAMPLES 41-43 AND EXPERIMENT G $Y_{1-y}Gd_yNb_{0.05}Ta_{0.95}O_4$

Gd can also be substituted in the instant composition to adjust the phosphor speed. In order to demonstrate this, various amounts of Gd were substituted for Y in the phosphor with the highest speed measured and reported herein, namely, $YNb_{0.05}Ta_{0.95}O_4$, an embodiment of the previously described $YNb_xTa_{1-x}O_4$. The compositions with the M' structure were prepared in a manner identical to that used for Example 1. The amounts of oxide used for each preparation are shown in Table IX. All products were single phase with the M' structure. For these compositions X-ray performance was measured by the method used for Examples 17–21. The results are shown in Table IX along with the results for the $YNb_{0.05}Ta_{0.95}O_4$ of Example 1 for comparison. The relative intensities of all compositions in the table were measured at substantially the same time. The phosphor of Experiment G is not useful in this invention.

TABLE IX

| | Product Composition | Grams | | | | Relative Intensity |
|---|---|---|---|---|---|---|
| | | $Gd_2O_3$ | $Y_2O_3$ | $Nb_2O_5$ | $Ta_2O_5$ | |
| Ex. No. | | | | | | |
| 1 | $YNb_{0.05}Ta_{0.95}O_4$ | 0 | 5.381 | 0.317 | 10 | 1.9 |
| 41 | $Y_{0.99}Gd_{0.01}$—$Nb_{0.05}Ta_{0.95}O_4$ | 0.086 | 5.329 | 0.317 | 10 | 1.80 |
| 42 | $Y_{0.95}Gd_{0.05}$—$Nb_{0.05}Ta_{0.95}O_4$ | 0.432 | 5.114 | 0.317 | 10 | 1.26 |
| 43 | $Y_{0.9}Gd_{0.1}$—$Nb_{0.05}Ta_{0.95}O_4$ | 0.864 | 4.845 | 0.317 | 10 | 0.83 |
| Expt. No. | | | | | | |
| G | $Y_{0.8}Gd_{0.2}$—$Nb_{0.05}Ta_{0.95}O_4$ | 1.728 | 4.307 | 0.317 | 10 | 0.52 |

EXAMPLES 44–47 AND EXPERIMENTS H AND I $Y_{1-y}La_yNb_{0.05}Ta_{0.95}O_4$

Phosphor speed can also be adjusted by incorporating La into the phosphor. In order to demonstrate this, various amounts of La were substituted for Y in the phosphor with the highest speed measured and reported herein, namely, $YNb_{0.05}Ta_{0.95}O_4$, an embodiment of the previously described $YNb_xTa_{1-x}O_4$. The compositions with the M' structure were prepared in a manner identical to that used for Example 1. The amounts of oxide used for each preparation are shown in Table X. All products were single phase with the M' structure. For these compositions X-ray performance was measured by the method used for Examples 17–21. The results are shown in Table X along with those for the $YNb_{0.05}Ta_{0.95}O_4$ of Example 1 for comparison. The relative intensities of all compositions in the table were measured at substantially the same time. The phosphors of Experiments H and I are not useful in this invention.

Table X

| | Product Composition | Grams | | | | Relative Intensity |
|---|---|---|---|---|---|---|
| | | $Y_2O_3$ | $La_2O_3$ | $Nb_2O_5$ | $Ta_2O_5$ | |
| Ex. No. | | | | | | |
| 1 | $Nb_{0.05}Ta_{0.95}O_4$ | 5.381 | 0 | 0.317 | 10 | 1.8 |
| 44 | $Y_{0.9}La_{0.1}$—$Nb_{0.05}Ta_{0.95}O_4$ | 4.843 | 0.776 | 0.317 | 10 | 1.6 |
| 45 | $Y_{0.8}La_{0.2}$—$Nb_{0.05}Ta_{0.95}O_4$ | 4.305 | 1.553 | 0.317 | 10 | 1.4 |
| 46 | $Y_{0.7}La_{0.3}$—$Nb_{0.05}Ta_{0.95}O_4$ | 3.767 | 2.329 | 0.317 | 10 | 1.1 |
| 47 | $Y_{0.6}La_{0.4}$—$Nb_{0.05}Ta_{0.95}O_4$ | 3.229 | 3.106 | 0.317 | 10 | 0.9 |
| Expt. No. | | | | | | |
| H | $Y_{0.5}La_{0.5}$—$Nb_{0.05}Ta_{0.95}O_4$ | 2.690 | 3.882 | 0.317 | 10 | 0.6 |
| I | $Y_{0.4}La_{0.6}$—$Nb_{0.05}Ta_{0.95}O_4$ | 2.152 | 4.658 | 0.317 | 10 | 0.3 |

EXAMPLE 48

A. A reflective suspension was prepared by milling the following ingredients in a ball mill for a period of about 20 hours:

| | |
|---|---|
| Titanium Dioxide | 100 g |
| Chlorosulfonated polyethylene | 40 g |
| n-Butyl Acetate | 105 g |
| Mixed petroleum naphtha (Initial Boiling Point 247° F. API grade of 59–61 at 60° F. and specific gravity of 0.7385) | 105 g |
| Dioctyl ester of sodium sulfosuccinic acid | 2 g. |

The milled suspension was filtered, coated on a 0.010 inch (0.0254 cm) thick sheet of biaxially-oriented polyethylene terephthalate, to a wet thickness of 0.010 inch (0.0254 cm), and dried. The coating procedure was repeated several times.

B. A phosphor suspension was prepared by milling the following ingredients in a ball mill for about 10 hours:

| | | |
|---|---|---|
| M'-type Yttrium Niobium Tantalate Phosphor ($YNb_{0.03}Ta_{0.97}O_4$): | 425 | g |
| Polyvinyl Butyral (PVB) Binder Solution | 172.4 | g. |

The PVB solution was comprised of the following ingredients:

| | | |
|---|---|---|
| n-Butyl acetate | 164.1 | g |
| n-Propanol | 164.1 | g |
| Polymeric organic silicone fluid (2% by wt in toluene) | 8.1 | g |

-continued

| | | |
|---|---|---|
| Potassium salt of monoethylphenyl-phenolmonosulfonic acid | 2.2 | g |
| Glycerol monolaurate | 13.5 | g |
| Polyvinyl butyral (granular, intrinsic viscosity 0.81) | 54.0 | g |

Figure 9:
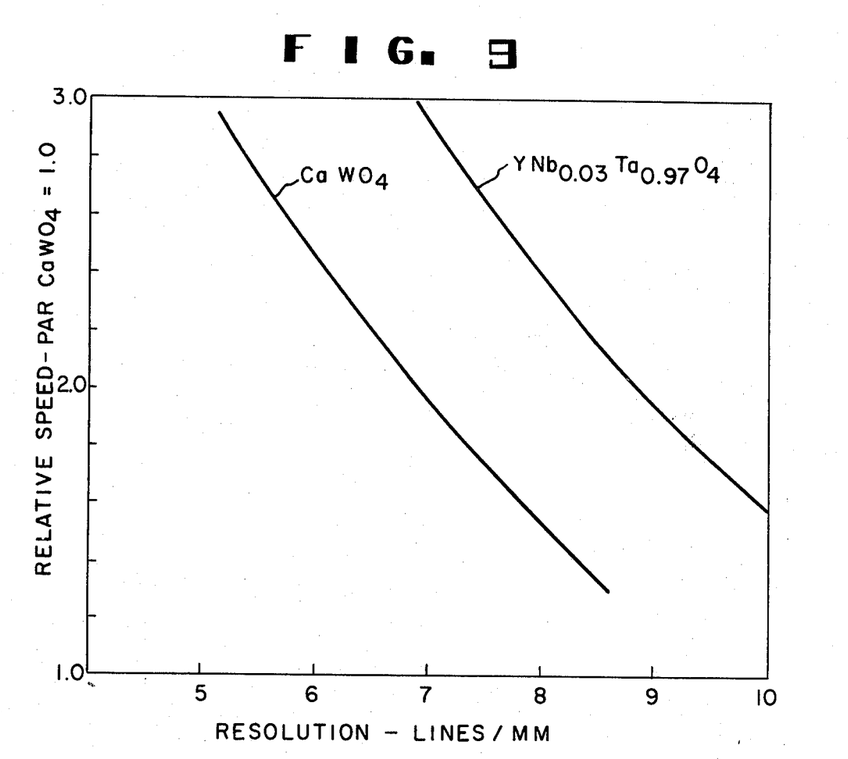
FIG. 9 shows plots of relative speed vs. resolution for X-ray screen pairs of the instant invention and the screen pairs of $CaWO_4$ prepared in a similar manner.

This phosphor suspension was then coated over reflective elements which had been prepared as described above in part A. The phosphor layer coating weights were varied from a wet thickness of 0.01 to 0.03 inch (0.0254 to 0.0762 cm). The screens prepared in this manner were suitable for use as X-ray screens. Each of these screens was tested by exposure, in conjunction with a portion of conventional X-ray film, to an X-ray unit at 80 KVp, 2 mAs through a 2 mm aluminum filter. A step-wedge and a resolving power target were also placed between the X-ray source and the film/screen (in direct contact therewith). Each film was then developed, fixed and washed in a conventional X-ray developing system and the speed and resolution were determined for each sample. These measurements were also made on control samples which utilized conventional calcium tungstate phosphors, the control samples being prepared and coated, at similar coating weights, over similar reflective layers. For all comparable samples the $YNb_xTa_{1-x}O_4$-type phosphor screens show improved performance over the $CaWO_4$ screens. This can be seen in FIG. 7, where resolution is plotted against the phosphor coating weight, and in FIG. 9, where the speed of the screen relative to Par $CaWO_4 = 1.0$ is plotted against the resolution obtained.

EXAMPLE 49

A phosphor suspension was prepared by milling the following ingredients in a ball mill for about 6 hours:

| | |
|---|---|
| Yttrium Niobium Tantalate Phosphor ($YNb_{0.05}Ta_{0.95}O_4$): | 4400 g |
| Polyvinyl Butyral (PVB) Binder Solution | 2977 g |

The PVB solution was comprised of the following ingredients (in weight %):

| | |
|---|---|
| n-Butyl acetate | 40.4 |
| n-Propanol | 40.4 |
| Polymeric organic silicone fluid (2% by wt in toluene) | 2.0 |
| Potassium salt of monoethylphenyl-phenylmonosulfonic acid | 0.6 |
| Glycerol monolaurate | 3.3 |
| Polyvinyl butyral (granular, intrinsic viscosity 0.81) | 13.3 |

The phosphor suspension was then coated over a reflective layer which had been prepared as described in part A of Example 48 and which had already been coated on respective polyethylene terephthalate film supports as described therein. Several individual coatings were made, varying the wet thickness of the phosphor from about 0.02 to 0.045 inch (0.0508 to 0.1143 cm). After drying, each of the phosphor layers was overcoated with a thin protective layer of a cellulose ester polymer and the screens were then baked overnight at about 70° C. The final screens prepared in this manner were eminently suitable for use as X-ray screens and were tested as described in Example 48. When compared to conventional $CaWO_4$ screens they produced superior results in speed and image sharpness.

UTILITY

The luminescent material described above is useful as a phosphor in X-ray intensifying screens.

I claim:
1. Process for preparing the phosphor having the monoclinic M' structure and selected from the group consisting of:
 (a) $YNb_xTa_{1-x}O_4$, where x is 0 to about 0.15;
 (b) $LuNb_xTa_{1-x}O_4$, where x is 0 to about 0.2;
 (c) $Y_{1-y}Tm_yTaO_4$, where y is 0 to about 0.03;
 (d) a solid solution of (a) and (b);
 (e) a solid solution of (a) and (c);
 (f) $Y_{1-y}Tb_yTaO_4$, where y is about 0.001 to about 0.15;
 (g) $Lu_{1-y}Tb_yTaO_4$, where y is about 0.001 to about 0.15;
 (h) $Gd_{1-y}Tb_yTaO_4$, where y is about 0.001 to about 0.15;
 (i) a solid solution of at least two of (f), (g) and (h);
 (j) any of (a) to (i) wherein up to 45 mole percent of the yttrium, lutetium or gadolinium is replaced by lanthanum;
 (k) any of (a) to (i) wherein up to 15 mole percent of the yttrium, lutetium or gadolinium is replaced by ytterbium; and
 (l) any of (a), (b), (c), (d) and (e) wherein up to 15 mole percent of the yttrium or lutetium is replaced by gadolinium,
which process comprises the steps:
 (a) intimately mixing stoichiometric quantities of appropriate precursor oxides;
 (b) prefiring the resultant mixture in air in an inert container at about 1000° C. to about 1200° C. for about 10 to about 14 hours;
 (c) mixing the resultant prefired mixture with a flux selected from the group consisting of $Li_2SO_4$, LiCl and a $BaCl_2$/LiCl eutectic mixture, the weight of the flux being 1/5 to ½ of the total weight of the mixture;
 (d) firing the flux-containing mixture in an inert container at about 1100° C. to less than about 1450° C. for at least about 3 hours; and
 (e) recovering the phosphor. (e) recovering the phosphor.

2. Process of claim 1 wherein the firing of the flux-containing mixture is carried out at about 1100° C. to about 1300° C.

3. Process for preparing the phosphor having the monoclinic M' structure and selected from the group consisting of:
 (a) $YNb_xTa_{1-x}O_4$, where x is 0 to about 0.15;
 (b) $LuNb_xTa_{1-x}O_4$, where x is 0 to about 0.2;
 (c) $Y_{1-y}Tm_yTaO_4$, where y is 0 to about 0.03;
 (d) a solid solution of (a) and (b);
 (e) a solid solution of (a) and (c);
 (f) $Y_{1-y}Tb_yTaO_4$, where y is about 0.001 to about 0.15;
 (g) $Lu_{1-y}Tb_yTaO_4$, where y is about 0.001 to about 0.15;
 (h) $Gd_{1-y}Tb_yTaO_4$, where y is about 0.001 to about 0.15;
 (i) a solid solution of at least two of (f), (g) and (h);
 (j) any of (a) to (i) wherein up to 45 mole percent of the yttrium, lutetium or gadolinium is replaced by lanthanum;

(k) any of (a) to (i) wherein up to 15 mole percent of the yttrium, lutetium or gadolinium is replaced by ytterbium; and (l) any of (a), (b), (c), (d) and (e) wherein up to 15 mole percent of the yttrium or lutetium is replaced by gadolinium, which process comprises the steps:

(a) intimately mixing stoichiometric quantities of appropriate precursor oxides and a flux selected from the group consisting of $Li_2SO_4$, LiCl and a $BaCl_2$/LiCl eutectic mixture, the weight of the flux being 1/5 to ½ of the total weight of the mixture;

(b) firing the resultant mixture in an inert container at about 1100° C. to less than about 1450° C. for at least about 4 hours; and (c) recovering the phosphor.

4. Process of claim 3 wherein the flux is $Li_2SO_4$.

5. Process of claim 4 wherein the firing is carried out at about 1100° C. to about 1300° C.

6. An X-ray intensifying screen comprising a phosphor-binder coating upon a flexible support wherein the phosphor is comprised of colorless single-phase particles having a surface area of about 0.075 to 0.300 m²/g, a particle size of about 3 to 10 μm, the monoclinic M' structure and selected from the group consisting of:

(a) $YNb_xTa_{1-x}O_4$, where x is 0 to about 0.15;

(b) $LuNb_xTa_{1-x}O_4$, where x is 0 to about 0.2;

(c) $Y_{1-y}Tm_yTaO_4$, where y is 0 to about 0.03;

(d) a solid solution of (a) and (b);

(e) a solid solution of (a) and (c);

(f) $Y_{1-y}Tb_yTaO_4$, where y is about 0.001 to about 0.15;

(g) $Lu_{1-y}Tb_yTaO_4$, where y is about 0.001 to about 0.15;

(h) $Gd_{1-y}Tb_yTaO_4$, where y is about 0.001 to about 0.15;

(i) a solid solution of at least two of (f), (g) and (h);

(j) any of (a) to (i) wherein up to 45 mole percent of the yttrium, lutetium or gadolinium is replaced by lanthanum;

(k) any of (a) to (i) wherein up to 15 mole percent of the yttrium, lutetium or gadolinium is replaced by ytterbium; and (l) any of (a), (b), (c), (d) and (e) wherein up to 15 mole percent of the yttrium or lutetium is replaced by gadolinium.

7. Screen of claim 6 wherein the phosphor is $YNb_xTa_{1-x}O_4$ where x is 0 to about 0.15.

8. Screen of claim 7 wherein x is about 0.02 to about 0.10.

9. Screen of claim 8 wherein the phosphor is $YNb_{0.05}Ta_{0.95}O_4$.

10. Screen of claim 6 wherein the phosphor is $Y_{1-y}Gd_yNb_{0.05}Ta_{0.95}O_4$ where y is 0 to about 0.15.

11. The screen of claim 6 wherein the phosphor-binder coating is comprised of about 85% to about 96% phosphor by weight.

12. Screen of claim 11 wherein the phosphor is $YNb_xTa_{1-x}O_4$ where x is 0 to about 0.15.

13. Screen of claim 12 wherein x is about 0.02 to about 0.10.

14. Screen of claim 13 wherein the phosphor is $YNb_{0.05}Ta_{0.95}O_4$.

15. Screen of claim 11 wherein the phosphor is $Y_{1-y}Gd_yNb_{0.05}Ta_{0.95}O_4$ where y is 0 to about 0.15.

* * * * *